Figure 1:
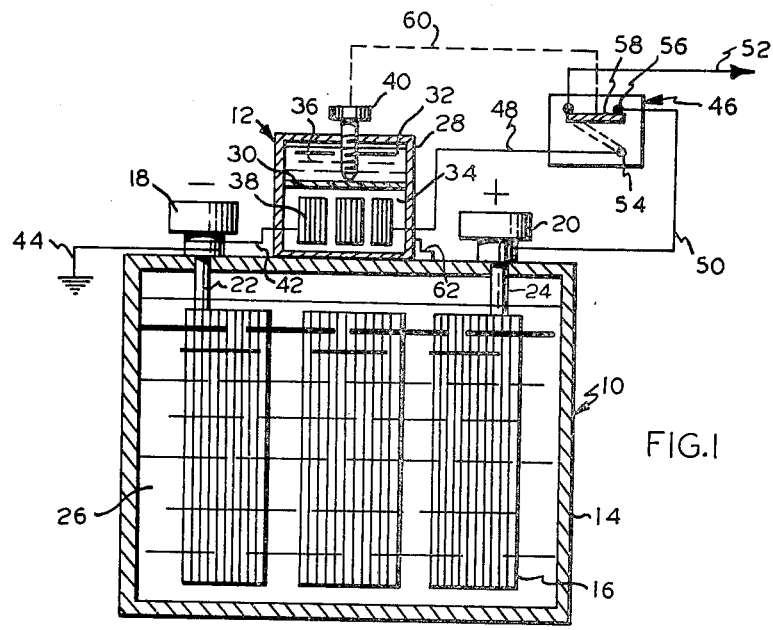

Aug. 10, 1965  A. K. ROBERTS  3,200,014
AUXILIARY BATTERY ARRANGEMENT
Filed Feb. 14, 1962

United States Patent Office 3,200,014
Patented Aug. 10, 1965

3,200,014
AUXILIARY BATTERY ARRANGEMENT
Alan King Roberts, 2 Parkway Drive,
Roslyn Heights, N.Y.
Filed Feb. 14, 1962, Ser. No. 173,234
5 Claims. (Cl. 136—181)

This invention relates to battery arrangements.

It is an object of the invention to provide for immediate relief and assistance in the situation where a battery, constituting the main power source for a vehicle, becomes inoperative or ineffective.

In the event, for example, that the battery of a vehicle weakens, it is possible that said vehicle might be stranded far from help or under distressing circumstances. The problem is particularly acute when the operator is a woman.

Strangely enough, only minor remedial action is necessary since, once the vehicle is started, the power supply function is self-sustaining and the vehicle can be readily removed to a service station for a more permanent cure.

It is therefore contemplated in accordance with the invention that a small supply of power be kept in reserve and in idle condition for activation when needed in an emergency. This auxiliary supply for example, may consist of a unit wherein a frangible member keeps separate the electrodes and electrolyte of a battery, provision being made for the fracturing of said member.

Embodiments of the invention may take various forms. For example, the auxiliary unit may be built into a conventional battery. Alternatively, the unit may be a separate and distinct unit physically affiliated with a principal source. Still further, the unit may be a unit which is conveniently stored in complete dissociation from the main source but which is readily substituted therefor.

As one feature of the invention, means may be provided for conveniently switching the auxiliary device into an ignition circuit in place of the main supply.

As another feature, activation of the auxiliary supply can be effected from a remote position such as the dashboard zone of an automobile.

As still another feature, the auxiliary unit can be constituted by a self-contained mobile unit predisposed for rapid connection in the electrical circuit of a vehicle.

Advantageously, the auxiliary unit of the invention can be fabricated as a disposable article of manufacture. More particularly, its use is required only for a relatively small number of applications so that its destruction is unimportant and thus its components can be of relatively cheap construction.

The fact that only one or a few uses of the auxiliary unit of the invention is required results in the possibility of making the construction thereof relatively small.

In addition to the applications of the invention in connection with automobiles, the invention may also be used in airplanes and the like, wherein it may be necessary to provide a source of electrical power on relatively short notice.

Figure 2:
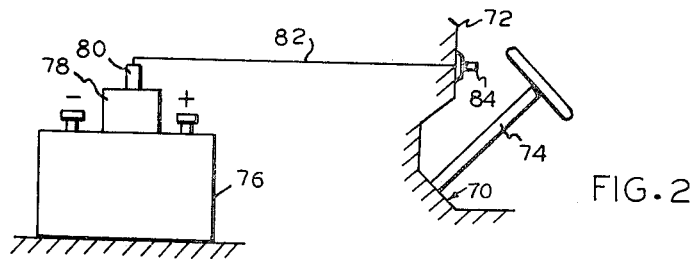
Figure 3:
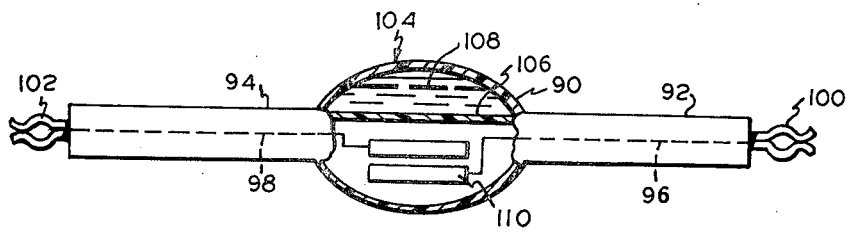

Other objects, features and advantages of the invention will be apparent from the following detailed description of some preferred embodiments as illustrated in the accompanying drawing in which:

FIG. 1 diagrammatically illustrates, partly in cross-section, a main power supply in association with which is provided an auxiliary power supply in accordance with one embodiment of the invention;

FIG. 2 illustrates diagrammatically an embodiment of the invention providing for remote control of the activation of the auxiliary unit of the invention; and FIG. 3 illustrates diagrammatically and, partly in cross-section, a mobile disposable unit adapted for ready connection in a vehicle or the like in accordance with the invention.

The embodiment of the invention illustrated in FIG. 1 relates to the physical combination of a main battery with an auxiliary battery.

More particularly, FIG. 1 illustrates a main battery 10 in association with which is arranged an auxiliary battery 12.

Main battery 10 comprises a casing 14, electrodes 16, terminals 18 and 20 and connecting posts 22 and 24. The electrodes 16 are submerged in conventional manner in an electrolyte 26.

The auxiliary battery 12 comprises a casing 28, the enclosure of which is divided by a frangible member 30 into an upper compartment 32 and a lower compartment 34. The frangible member 30 can be fabricated, for example, of plastic, glass, hard rubber of the like and of any material which is inert with respect to an electrolyte 36 which is maintained in the upper chamber 32.

In the lower chamber 34 are arranged the electrodes 38.

The electrodes 38 are of a suitable number and size to provide the desired voltage such as, for example, 6 or 12 volts. These electrodes may be spaced by conventional electrode spacers and are fixed in predetermined relationship relative to the casing.

Normally, the electrodes 38 are inactive and upon the battery 12 being activated, the electrodes 38 will be called upon to generate no more than a few bursts of electrical energy.

Operatively associated with the casing 28 is a plunger 40 which can be arranged in slidable but hermetically sealed relationship with respect to the casing 28 by means of an appropriate bushing (not shown). Alternatively the plunger 40 may have a threaded engagement with the casing so as to be urged against the frangible member 30 by a screw-type action.

The function of the plunger 40 is to fracture the frangible member 30 when desired so as to release the electrolyte 36 into the lower chamber 34 thereby to activate the electrodes 38.

The battery 12 is connected to exterior terminal 18 by a line 42 and thence to ground which may be the vehicle chassis by means of a line 44. Connections 42 and 44 may be permanent if so desired.

It is possible to connect the battery 12 directly to exterior terminal 20. Alternatively, however, the battery 12 and the exterior terminal 20 can be connected to a switch 46 by means of lines 48 and 50 respectively. The purpose of switch 46 is to connect the main battery 10 and the auxiliary battery 12 selectively in the ignition circuit of the associated vehicle as indicated by the line 52.

For the above purpose line 48 is connected to a contact 54 in the switch 12 whereas line 50 is connected to a contact 56. Also included in the switch 46 is a switch blade 58 adapted to connect contacts 54 and 56 selectively to line 52 to effect the above noted function.

According to the invention, there is provided a mechanical connection 60 in any desired form whatsoever, which relates the actuation of plunger 40 to the actuation of switch 46. Thus a force applied through element 60 can be effective to actuate the plunger 40 and the switch 46 simultaneously whereupon at one time electrolyte is released into lower chamber 34 of auxiliary battery 12, battery 12 is connected into the ignition circuit of the associated vehicle, and battery 10 is disconnected from said circuit. As a result of the use of switch 46, short circuits or the like in battery 10 will not be effective to impede the operation of auxiliary cell 12.

It is to be appreciated that the illustration in FIG. 1 is diagrammatic only, it being contemplated that the battery 12 can be made an integral part of the battery 10 such that a single unitary casing is provided for the same. Nevertheless, it is possible to arrange battery 12 in superposed or other such relationship as indicated in the drawing there being provided, for example, a bracket 62 which facilitates ready displacement of the battery 12 which, as a consequence, can be fabricated as a dispensible and replaceable unit.

It will be understood that under certain circumstances, the operation or actuation of the auxiliary unit of the invention is to be facilitated, such as, for example, by avoiding the necessity of having to open the hood of an automobile and so as to permit the operation of the auxiliary cell from the interior of the vehicle as might be important, for example, in inclement weather or the like.

FIG. 2 illustrates diagrammatically, a vehicle chassis 70 associated with a dashboard 72 in the region of which, as is conventional, is the steering column 74 of the said vehicle.

As in FIG. 1, there is provided a main unit 76 and an auxiliary unit 78, a plunger 80 being diagrammatically represented for purposes of activating the auxiliary unit.

In accordance with the invention, there is provided a Bowden cable 82 consisting in conventional manner of a flexible external sheath with an axially displaceable cable therein, the axially displaceable cable being operated remotely by means of the control or plunger 84 on the dashboard.

This embodiment of the invention is illustrative only of the variation by means of which it is intended that a remote control be provided for actuating an auxiliary cell in accordance with the invention. Thus, for example, the Bowden cable might be replaced by an electrical control actuating a solenoid or the like.

It is to be noted that this embodiment of the invention is susceptible of being introduced into an automobile at some time subsequent to its manufacture in the manner previously contemplated with respect to remote garage door controls and so forth.

FIG. 3 illustrates a still further embodiment of the invention wherein the unit is provided separately in the form of a unit adapted for being stored in the trunk of the car or the like.

In FIG. 3 is shown a flexible plastic casing 90 of monolithic structure including outwardly extending sheaths 92 and 94 wherein are accommodated leads 96 and 98 at the ends of which are connected clamps 100 and 102.

Within the central portion 104 of this device is arranged a frangible member 106 dividing the central compartment into upper and lower chambers, there being an electrolyte 108 stored in the upper chamber and electrodes 110 (diagrammatically illustrated) in the lower chamber.

The plastic may be, for example, any polyvinyl chloride or like plastic susceptible of maintaining the electrolyte in hermetically sealed relationship and adapted for the extension of leads 96 and 98 therethrough for connection to the electrodes 110.

In the latter embodiment of the invention, the outer casing may be readily flexed to fracture frangible member 106 whereupon the electrodes 110 are submerged in the electrolyte and the auxiliary unit adapted for generating an electrical current.

One of the clamps 100 and 102 may be replaced by a collar or the like in order to distinguish readily between the connection to ground and the connection to the ignition circuit.

There will now be obvious to those skilled in the art many modifications and variations of the techniques and structure set forth above. These modifications and variations will not however depart from the scope of the invention if defined by the following claims.

What is claimed is:

1. In combination: first and second batteries, said first battery comprising a casing, an electrolyte in said casing, electrodes immersed in said electrolyte, and exterior terminals on said casing and coupled to said electrodes; said second battery comprising a casing, a frangible member in the latter said casing dividing the same into separate chambers, an electrolyte in one of said separate chambers, electrodes in the other of said separate chambers, coupling means to couple the latter said electrodes to said exterior terminals, and control means to break said frangible member to activate said second battery; said coupling means including a switch between said second battery electrodes and one of said terminals, said combination further including an output line, said switch being adapted for selectively switching the output line between said one terminal and said second battery electrodes, said control means being coupled to said switch for simultaneously actuating the same and breaking said frangible member.

2. The combination as claimed in claim 1 wherein said casings are integral.

3. The combination as claimed in claim 1 wherein said control means is a plunger.

4. The combination as claimed in claim 1 comprising a remote control coupled to and adapted for operating said control means.

5. The combination as claimed in claim 4, wherein the remote control is adapted for being located on the dashboard of a vehicle.

References Cited by the Examiner
UNITED STATES PATENTS

| | | | |
|---|---|---|---|
| 1,218,847 | 3/17 | Firey | 136—90 |
| 2,335,526 | 1/43 | Mitchell | 171—97 |
| 2,610,987 | 9/52 | Betz | 136—181 |
| 2,816,070 | 12/57 | Buchanan | 136—166 X |
| 2,851,510 | 9/58 | Pauli | 136—90 |
| 2,852,592 | 9/58 | Salauze | 136—90 |

WINSTON A. DOUGLAS, *Primary Examiner.*

JOHN R. SPECK, MURRAY TILLMAN, JOHN H. MACK, *Examiners.*